(12) United States Patent
Ebrahimi Afrouzi et al.

(10) Patent No.: US 12,050,438 B1
(45) Date of Patent: Jul. 30, 2024

(54) COLLABORATIVE INTELLIGENCE OF ARTIFICIAL INTELLIGENCE AGENTS

(71) Applicants: Ali Ebrahimi Afrouzi, Henderson, NV (US); Chen Zhang, Redmond, WA (US)

(72) Inventors: Ali Ebrahimi Afrouzi, Henderson, NV (US); Chen Zhang, Redmond, WA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 17/689,363

(22) Filed: Mar. 8, 2022

Related U.S. Application Data

(63) Continuation of application No. 16/747,334, filed on Jan. 20, 2020, now abandoned, which is a continuation of application No. 15/981,643, filed on May 16, 2018, now abandoned.

(60) Provisional application No. 62/610,633, filed on Dec. 27, 2017, provisional application No. 62/577,067, filed on Oct. 25, 2017, provisional application No. 62/535,736, filed on Jul. 21, 2017, provisional application No. 62/509,701, filed on May 22, 2017, provisional application No. 62/506,991, filed on May 16, 2017.

(51) Int. Cl.
*G05B 13/02* (2006.01)
*G06N 20/00* (2019.01)

(52) U.S. Cl.
CPC ......... *G05B 13/0205* (2013.01); *G06N 20/00* (2019.01)

(58) Field of Classification Search
CPC ..................... G05B 13/0205; G06N 20/00
See application file for complete search history.

(56) References Cited

U.S. PATENT DOCUMENTS

| | | | |
|---|---|---|---|
| 6,611,120 B2 | 8/2003 | Song | |
| 7,346,429 B2 | 3/2008 | Goldenberg | |
| 7,609,753 B1 | 10/2009 | Snodgrass | |
| 7,953,110 B1 | 5/2011 | Dorris | |
| 8,639,650 B1 | 1/2014 | Pierpoint Gill | |
| 11,119,496 B1 * | 9/2021 | Ebrahimi Afrouzi | ....................... G05D 1/0217 |
| 2009/0198376 A1 * | 8/2009 | Friedman | ............... G08C 17/00 700/248 |
| 2011/0035052 A1 * | 2/2011 | McLurkin | ............... G06N 3/008 901/1 |
| 2014/0207280 A1 * | 7/2014 | Duffley | ................ G05D 1/0016 700/257 |

(Continued)

*Primary Examiner* — Kenneth M Lo
*Assistant Examiner* — Mohammed Shafayet

(57) ABSTRACT

A system of two robots, including: a first robot, including: a plurality of sensors; a control system; and medium storing instructions that when executed by the control system of the first robot effectuates operations including: generating or updating a grid map of an environment; and transmitting a message to a control system of a second robot; and the second robot, including: a plurality of sensors; a control system; and a medium storing instructions that when executed by the control system of the second robot effectuates operations including: generating or updating a grid map of the environment independent from the gird map generated by the control system of the first robot; and actuating the second robot to begin performing coverage of the environment upon receiving the message from the control system of the first robot.

20 Claims, 8 Drawing Sheets

(56) References Cited

U.S. PATENT DOCUMENTS

| | | | |
|---|---|---|---|
| 2014/0207282 A1* | 7/2014 | Angle | B25J 13/006 |
| | | | 901/1 |
| 2015/0283703 A1 | 10/2015 | Izhikevich | |
| 2016/0075015 A1* | 3/2016 | Izhikevich | B25J 9/163 |
| | | | 901/5 |
| 2016/0129592 A1* | 5/2016 | Saboo | B25J 9/1661 |
| | | | 700/248 |
| 2016/0320774 A1* | 11/2016 | Kuhara | G05D 1/0289 |
| 2017/0083005 A1* | 3/2017 | Hickman | A01N 25/10 |
| 2018/0242806 A1 | 8/2018 | Haegermarck | |
| 2019/0217474 A1* | 7/2019 | Tang | A47L 9/2852 |

\* cited by examiner

COLLABORATIVE INTELLIGENCE OF ARTIFICIAL INTELLIGENCE AGENTS

CROSS-REFERENCE TO RELATED APPLICATIONS

This application is a Continuation of U.S. Non-Provisional patent application Ser. No. 16/747,334, filed Jan. 20, 2020, which is a Continuation of U.S. Non-Provisional patent application Ser. No. 15/981,643, filed May 16, 2018, which claims the benefit of U.S. Provisional Patent Application Nos. 62/506,991, filed May 16, 2017, 62/509,701, filed May 22, 2017, 62/535,736, filed Jul. 21, 2017, 62/577,067, filed Oct. 25, 2017, and 62/610,633, filed Dec. 27, 2017, each of which is hereby incorporated by reference.

FIELD OF THE DISCLOSURE

The field of invention relates to collaborative intelligence of artificial intelligence (AI) agents.

BACKGROUND

AI agents, such as robotic devices, have become increasingly used for carrying out routine tasks. For a task to be completed more efficiently, a network of AI agents may share their intelligence with one another and collaborate to complete the task. AI agents may also share their intelligence to enhance their situational awareness in order to more effectively collaborate by, for example, delegating tasks in the most efficient manner. For example, with collaborative AI, two robotic floor cleaners operating within the same environment may autonomously communicate to divide an area to be cleaned between the two of them thereby reducing the time it takes to clean the area. A method for dynamic collaboration between multiple AI agents by transmitting, receiving, and processing wireless signals among one another is therefore required. In prior art, hierarchical structure, wherein a control device directs multiple robots working on a common task is known, however the method does not allow autonomous collaboration between robotic devices. For example, the prior art describes a mobile robot hybrid communication link consisting of a remote unit with transmitter for an operator to remotely send command signals to robots. The prior art also introduces a mobile communication network to operate a robot remotely. Such methods in the prior art do not allow for autonomous collaboration between robotic devices as an operator uses a control unit to transmit and receive signals to and from robotic devices. In the defense industry, LINK-16, a secure way of communication exchange and situational awareness between military equipment, may be used. LINK-16 introduces different aspects of a communication line which establish a secure network between engaged units to exchange tactical information that may be used by automated systems or operatives. While LINK-16 provides a method for secure data exchange between engaged units, it does not provide a method for autonomous collaboration for completion of a task. In the mobile computing industry, the prior art describes a collaborative intelligence system whereby individual social users input their data, which is thereby processed, and an action is offered to users based on the data. However, the method requires user input and may not be adapted to allow for autonomous dynamic connection and collaboration between AI agents, wherein AI agents may autonomously create and terminate connections with one another based on outcome of collaborations.

SUMMARY

The following presents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented below.

Some aspects provide a system of at least two robots, including: a first robot, including: a plurality of sensors; a control system; and a tangible, non-transitory, machine-readable medium storing instructions that when executed by the control system of the first robot effectuates operations including: generating or updating, with the control system of the first robot, a grid map of an environment; tracking, with the control system of the first robot, grid cells of the grid map within which work has been performed in and grid cells of the grid map within which work is yet to be performed in by the first robot while the first robot continues to perform coverage of the environment; determining, with the control system of the first robot, a suggested operational schedule of the first robot based on previous times the first robot was operated, wherein a user is presented the suggested operational schedule; actuating, with the control system of the first robot, the first robot to operate according to the suggested operational schedule; and transmitting, with the control system of the first robot, a message to a control system of a second robot; and the second robot, including: a plurality of sensors; the control system; and a tangible, non-transitory, machine-readable medium storing instructions that when executed by the control system of the second robot effectuates operations including: generating or updating, with the control system of the second robot, a grid map of the environment independent from the gird map generated by the control system of the first robot; actuating, with the control system of the second robot, the second robot to begin performing coverage of the environment upon receiving the message from the control system of the first robot; and tracking, with the control system of the second robot, grid cells of the grid map generated by the control system of the second robot within which work has been performed in and work is yet to be performed in by the second robot while the second robot continues to perform coverage of the environment; wherein the control system of the first robot and the control system of the second robot are configured to establish a connection and communicate with an artificial intelligence home assistant device.

Some aspects include a method for collaboration between at least two robots, including: generating or updating, with a control system of a first robot, a grid map of an environment; tracking, with the control system of the first robot, grid cells of the grid map within which work has been performed in and grid cells of the grid map within which work is yet to be performed in by the first robot while the first robot continues to perform coverage of the environment; determining, with the control system of the first robot, a suggested operational schedule of the first robot based on previous times the first robot was operated, wherein a user is presented the suggested operational schedule; actuating, with the control system of the first robot, the first robot to operate according to the suggested operational schedule;

transmitting, with the control system of the first robot, a message to a control system of a second robot; generating or updating, with the control system of the second robot, a grid map of the environment independent from the gird map generated by the control system of the first robot; actuating, with the control system of the second robot, the second robot to begin performing coverage of the environment upon receiving the message from the control system of the first robot; and tracking, with the control system of the second robot, grid cells of the grid map generated by the control system of the second robot within which work has been performed in and work is yet to be performed in by the second robot while the second robot continues to perform coverage of the environment; wherein: the control system of the first robot and the control system of the second robot are configured to establish a connection and communicate with an artificial intelligence home assistant device; the first robot and the second robot are surface cleaning robots with different surface cleaning functions; and at least some processing is executed on the cloud or an external device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF SOME EMBODIMENTS

Figure 1:
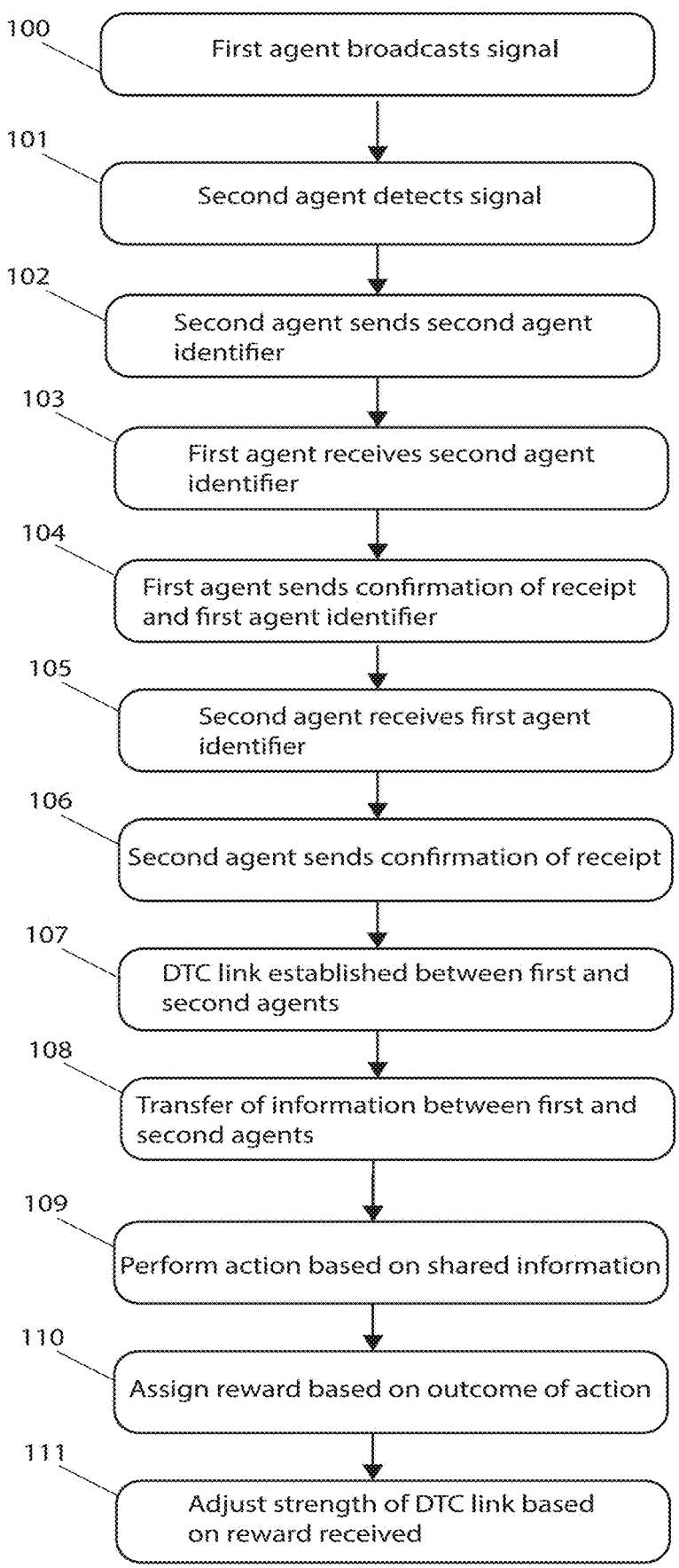
FIG. 1 illustrates an example of a method for collaborative intelligence of AI agents, according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments describe a method for collaborative intelligence of artificial intelligence (AI) agents. Some embodiments describe a method for communication, exchange of information, sharing of situational awareness, and delegation and distribution of different tasks between actuated and non-actuated AI agents. In some embodiments, AI agents may learn from each other or share information in real time during operation and/or while offline and/or while some AI agents are offline and others are online. In some embodiments, AI agents may connect through wired or wireless networking technologies and may use different security measures to protect their connection and communication contents. In some cases, the AI agents described herein may be actuated robots that may physically move and perform actions or non-actuated static computer based AI units. In some embodiments, AI agents may be equipped with sensors and an operating system software to monitor hardware subsystems. In some embodiments, AI agents may have different functionalities, manage security, analyze and share data and tasks, and resolve probable disputes between other AI peers. In some embodiments, a control system of an AI agent may track other AI agents within their vicinity, including information on the model, type, functionality, capability, role, operating system, security privileges, and approximate proximity (i.e., distance) of the other AI agents.

In some embodiments, control systems of AI agents employ collaborative intelligence and artificial intelligence. In some embodiments, collaborative intelligence may include AI agents learning from one another and artificial intelligence may include the control system of an AI agent learning from the environment (e.g., user feedback). For instance, a home control unit (e.g., voice assistant, home assistant, etc.) capable of learning preferences of a user (e.g. home temperature, music genre and schedule, cleaning schedule, alarm setting, etc.) from their actions over time is an example of artificial intelligence. Based on the preferences of the user learned over time, the control system of the home control unit may therefore, play a specific genre of music or set the shower to a specific temperature. If a second home control unit was introduced into the home, the control system of the first home control unit may share its intelligence with the control system of the second home control unit such that the control system of the second home control unit may learn the preferences of the user from the control system of the first home control unit, which may be considered collaborative intelligence. In some embodiments, the control system of each AI agent operating within the environment may learn from the environment (e.g., user feedback) and in some embodiments, may share their learned intelligence with the control systems of other AI agents to complete tasks more efficiently. For example, the control system of the second home control unit may learn from the control system of the first home control unit that the user prefers playing jazz music in the evening while the control system of the first home control unit may learn from the control system of the second home control unit what time the user prefers to wake up. In some embodiments, the control systems of AI agents may autonomously split tasks. For example, the control system of one home control unit may control home temperature while the control system of the other home control unit may control lighting in the home. In another example, a control system of a first surface cleaning robot shares its intelligence with a control system of a second surface cleaning robot and vice versa. In particular, the control system of the first surface cleaning robot may share with the control system of the second surface cleaning robot that the user likes the house cleaned at 8:00 AM and may learn from the control system of the second surface cleaning robot that its user prefers the house cleaned at 8:00 PM. By sharing such intelligence, both robots may autonomously collaborate with one another to schedule cleaning and determine, for example, cleaning location, cleaning time, and task allocation of each robot. In this way, multiple AI agents may collaborate to complete tasks by making decisions themselves without requiring user input to control their actions. In one example, the control system of a first robot learns that user A prefers a home temperature of 75° F. while the control system of a second robot learns that a user B prefers the home temperate at 73° F. The control systems of the robots may autonomously share intelligence and collaborate and may infer based on shared intelligence that a home temperature of 74° F. is best when both users are present and to set the temperature to the preferred temperature of each individual user when they are only present. In some instances, a user may choose AI agent settings. For example, control systems of two cleaning robots introduced into a same environment and with separate user preferences stored may share their respective stored user preferences with one another, however, a user may choose the new preferences if preferences chosen by the collaborating robots are not desired. The control systems of the robots may then learn the new user preferences for the future. In some embodiments, the control system of the robots may store the shared information and the user may choose preferences or settings. For example, a user of a first robotic cleaner may prefer that the robotic vacuum clean at 8:00 AM while a user of a second robotic cleaner, introduced into a same house, may prefer the robotic cleaner to clean at 8:00 PM. The control systems of the robots may share the cleaning preferences of their respective users with one another and may store the information online. A user may select a preferred time for cleaning by the robotic cleaners if the user does not want the robotic cleaners to clean the house more than once a day. The user may select that the robotic cleaners only clean at 8:00 AM or 8:00 PM rather than twice a day. The control systems of the robots may store this information and may share it as a user preference in the future. In some embodiments, information may be stored online, such as on the cloud, or may be stored on an external device.

In some embodiments, a control system of an AI agent may make inferences from shared intelligence. For instance, a control system of a robotic coffee machine may learn that a user typically gets home from a jog every morning at 5:00 AM and to therefore brew a cup of the coffee preferred by the user at 5:00 AM. If one day at 4:45 AM the control system of a collaborating robotic vacuum cleaner detects the front door opening, it may share this data with the control system of the robotic coffee machine and the control system of the robotic coffee machine may infer that the user is home early from their jog and may therefor brew a cup of coffee earlier than usual. In another example, the control system of a robotic tooth brush may collaborate with the control system of a robotic coffee maker, such that operation of the robotic tooth brush in the morning may be shared with the control system of the robotic coffee maker. The robotic coffee maker may therefore infer the user is awake and brew a cup of the preferred coffee of the user before the user reaches the kitchen. If there are two users within the home, the control system of the robotic coffee machine may infer the user based on probabilities and statistics of information in order to maximize comfort without wasting energy. For instance, if the control system of the robotic coffee machine infers both users are awake it may brew a medium roast in order to appease both users if one prefers light roast and the other dark roast.

In some embodiments, control systems of AI agents may collect and share data of multiple users to learn to make decisions benefiting all present users. For example, if two users prefer a robot to clean at 8:00 AM but one prefers mopping while the other prefers sweeping, the control system of the robot may decide to clean at 8:00 AM using both cleaning functionalities to benefit both users. In another example, an AI system that suggests movies based on learned movie preferences of a user may compile movie preferences of all present users in order to suggest movies that all users may enjoy. In some embodiments, the control system of an AI agent may create group profiles for users. For example, there may be five users living in a same house. An AI system may create user profiles, each having differing levels of preferences for comedy, romance, drama, sci-fi, and thriller movies. Two users may jointly watch a romantic movie and rate the romantic movie a score of 3/5, while the AI system expected a score of 5/5. The AI system may perform a few experiments and instead of adjusting the classification, the AI system may develop a new tree in the user profile hierarchy associating two or more user profiles into a group profile.

In some embodiments, the control system of a AI agent may provide suggestions to a user based on learned preferences of the user. For example, a control system of a robot may combine music preferences of a large group of individuals attending an event and suggest songs to play. In another example, control systems of housekeeping robots working at separate locations of a hotel chain may learn room preferences of an individual that often travels for work and stays within the same hotel chain and may prepare the room for the individual based on statistical information and probabilities from data previously collected or may provide suggestions to the user. For instance, the control system of a robot may decide to turn on a warm shower for the user at 6:15 AM based on previous intelligence on the time the user woke up and the temperature of the shower the user used. Or the control system of the robot may provide the user with a suggestion to set the alarm for 6:15 AM based on previous intelligence on the time the user woke up.

In some embodiments, control systems of AI agents may announce their presence and capabilities to a group of other AI agents within an area. In some embodiments, control systems of AI agents may gather and share information about one other to build a database and enhance their performance within their workplace. In some embodiments, control systems of AI agents may determine which AI agent within the group is best suited for specific tasks based on information shared among the AI agents. In some embodiments, AI agents may execute the tasks they are best suited for. In some embodiments, AI agents may establish a connection by one or more of: broadcasting a signal by a transmitter of a first AI agent, detecting the signal by a receiver of a second AI agent, sending a second AI agent identifier by a transmitter of the second AI agent, receiving the second AI agent identifier by a receiver of the first AI agent, sending confirmation of receipt of the second AI agent identifier and sending a first AI agent identifier by the transmitter of the first AI agent, receiving the first AI agent identifier by the receiver of the second AI agent, sending confirmation of receipt of the first AI agent identifier by the transmitter of the second AI agent, establishing a data transfer channel (DTC) link between the first and second AI agents by a control system of the first AI agent and a control system of the second AI agent, transferring information (e.g., by transmitting signals) between AI agents through the DTC link by the control system of the first AI agent and the control system of the second AI agent and, performing an action by at least one AI agent based on the transferred information. The DTC link may be, for example, a secure wireless connection (e.g. Wi-Fi, Bluetooth, or RF) between the first and second AI agents.

In some embodiments, collaborating AI agents are actuators that take action or observers that observe the surroundings. In some embodiments, the DTC link is between two actuators, two observers or an actuator and an observer. In some embodiments, the control system of a AI agent establishes more than one DTC link. Different configurations of connections between collaborating AI agents may exist. For example, connection between two AI agents, connection from one AI agent to multiple AI agents, connection from multiple AI agents to one AI agent, etc. In some embodiments, DTC links are one-way connections wherein transfer of information is unidirectional, are two-way wherein information is bidirectional, or are more complex. While the simplest form of connection may be a connection between a pair of AI agents, the number of connected AI agents may be unlimited given computing cost is not a factor. In a discrete state space, it may be concluded that with the law of total probability the maximum number of connections of an actuator agent is limited by the maximum number of state spaces the actuator agent may choose from to earn a reward. In some embodiments, the control system of an AI agent assigns a measure of strength to a DTC link with another collaborating AI agent. In some embodiments, the control system adjusts the measure of strength based on the outcome of the collaboration. In some embodiments, the measure of strength of the DTC link is a probability of the action resulting in a maximum reward. In some embodiments, the DTC link is a vector with magnitude and direction. In some embodiments, the absolute value of the magnitude denotes the strength of the link and represents a probability between 0 and 1 of the action or collaboration resulting in a maximum reward, wherein a value of 1 signifies a very strong link. In some embodiments, if the collaboration between AI agents is useful for both AI agents, then the respective control systems increase the measure of strength of the DTC link as well as the level of confidence in the information received from the collaborating AI agent. If the exchange of information is useless to the collaborating AI agents, the respective control systems reduce the measure of strength of DTC link and, if collaboration is repeatedly useless, the shared information may eventually be discarded and the DTC link terminated by the respective control systems. For example, if sensor measurements of the environment from a first robot indicate an opening at a specific location and the second robot with whom the information has been shared travels to the specific location and finds a wall, then the exchange of information was not helpful and the control system of the second robot decreases the measure of strength of the DTC link as well as the level of confidence of the information received from the first robot.

FIG. 1 illustrates an example of a method for collaborative intelligence of AI agents. At first step 100 a first AI agent broadcasts a signal by its transmitter. At second step 101 a second AI agent detects the signal by its receiver. At third step 102 the second AI agent sends a second agent identifier by its transmitter. At fourth step 103 the first AI agent receives the second agent identifier by its receiver and at fifth step 104 sends confirmation of receipt of the second agent identifier and sends a first agent identifier by its transmitter. At sixth step 105 the second AI agent receives the first agent identifier by its receiver and at seventh step 106 sends confirmation of receipt by its transmitter. At eighth step 107 the control systems of the first and second agents establish a DTC link and at ninth step 108 the control systems transfer information between agents through the DTC link. At tenth step 109 one or more actions are performed by at least one agent based on the transferred information. At eleventh step 110 a reward is assigned by the control systems of the agents based on the outcome of the one or more actions performs and at a twelfth step 111 a measure of strength of the DTC link is adjusted based on the magnitude of the reward received.

In some embodiments, the control system of an AI agent may form, strengthen, weaken, or terminate DTC links with other AI agents, with the goal of forming coalitions that maximize the reward. For example, for a DTC link between an observer and actuator, the strength of the DTC link may be reinforced by the control system when $\exists o(t) \in O \land \exists a(t) \in A$, $a(t)|o(t-1) \Rightarrow P[r^*(t) > r(t)]$, wherein $o(t)$ is an observation within the set of observations $O$, $a(t)$ is an action within the set of actions $A$, and $r^*(t)$ is the optimal reward compared to all rewards in $\{r\}$, $\forall r \in \{r\} | P[r^* > r]$. For two actuators with actions $\alpha_i$ and $\alpha_2$, $\exists \alpha_1(t) \in U \land \exists \alpha_2(t) \in A$, wherein a maximum reward may be assigned by the control system by, for example, saving time. The sum of the reward of $r_1$ and $r_2$ at time t is larger than the sum of $r_1$ at time t and $r_2$ at time t+1, i.e., $(r_1+r_2)(t)|(\alpha_1+\alpha_2)(t) > r_1(t)+r_2(t+1))|(\alpha_1(t)+\alpha_2(t+1))$. For two observers, maximum reward may be assigned by the control system for, for example, useful information gain. This may be quantified by the control system using conditional entropy $H(O_1|O_2)=H(O_1|O_2)-H(O_1)+H(O_2)$, wherein, the combination of observations $O_1$ and $O_2$ should reduce the entropy H of observation $O_1$ given its combination with observation $O_2$ for useful information gain. For example, the data captured from two CCTV cameras may be combined with one another to produce a higher resolution image or portion of an image. In embodiments, the DTC link may be terminated by the control system of an agent if the strength of the DTC link is below a specified threshold. The goal is to form relationships that provide the most reward and hence have the strongest links.

In some embodiments, Reinforcement Learning (RL) may be used by the control system of an AI agent to learn with which AI agents a strong DTC link may be formed and hence with which AI agents may the most useful coalitions be formed. In an Agent-Environment RL model, AI agents may learn to interact with the environment by trial and error. An AI agent may act on the environment and after each action, the agent may receive feedback by the control system comprising a reward and a next state of the environment. In some embodiments, one goal over time is for the control system of the AI agent to learn through feedback which actions maximize the reward. Formally, RL may be defined by a set of actions A that an agent may take to achieve its goal, a set of states S that may represent the agent's understanding/information of the current environment, and a reward function R that may be used in learning an optimal policy to guide the agent's actions based on its states. In RL, an AI agent may observe the current state s ∈S at time t, choose an action α ∈A according to a stochastic policy r, receive a reward r, and transitions to a new state s. The objective of RL may be to determine the policy π (i.e., a set of rules to select an action in each possible state) that maximize the AI agent's accumulated reward in a dynamical environment. In a changing environment, AI agents may use RL to cope with unpredictability. By learning from trial-and-error, an AI agent may adapt its behavior to a novel or changing environment. In an Agent-Environment RL model, an AI agent may make an observation, perform an action, and receive a reward. The goal may be to maximize the future reward. RL AI agents may modify their behavior based on the rewards while interacting with the environment. By trying to maximize the rewards, an AI agent may learn complex long-term strategies.

In some embodiments, the control system of an AI agent may form its first few DTC links randomly when starting in state where the AI agent does not have any links. If control system of the AI agent experiments infinitely, eventually it will converge to some DTC links. However, in order to expedite convergence, the control system may use genetic algorithms wherein the AI agent keeps its most reward generating DTC links and terminates its lowest reward generating DTC links. For example, an action may be to combine sensor data from one robot with sensor data from a second robot. If the action of combining the sensor data results in readings with higher confidence level, a reward with greater value may be assigned as compared to the value of the reward assigned if the combination of sensor data results in readings with lower confidence level. A greater reward assigned by the control systems of collaborating AI agents as a result of collaboration between the AI agents may translate to a stronger DTC link between the two. For example, the magnitude of a DTC link between an observer and actuator with an absolute value of one may signify a strong link and that the actions taken by the actuator given the observations from the observer generate maximum reward with a probability of one. In some embodiments, actions may be taken by an AI agent to transition from one state to another and after transitioning to each new state the control system may assign a reward to the AI agent. For two collaborating AI agents, for example, both may transition to a new state after taking an action to collaborate. The reward may be assigned to both collaborators by their respective control systems in one embodiment or may be assigned to one AI agent by its control system and back propagated to the other AI agent. In some embodiments, the reward may be divided unevenly between collaborating AI agents.

In some embodiments, the control system of an AI agent may implement RL using a Markov Decision Process (MDP) consisting of a sequence of states and actions followed by rewards. A greater reward assigned by the control systems of collaborating AI agents as a result of collaboration between the AI agents may translate to a stronger DTC link between the two. In some embodiments, actions may be taken by an AI agent to transition from one state to another and after transitioning to each new state the control system may assign a reward to the AI agent. For two collaborating AI agents, for example, both may transition to a new state after taking an action to collaborate. In some embodiments, the reward may be assigned by the control system of each AI agent or may be assigned by the control system of one AI agent and back propagated to the control system of the other AI agent based on the outcome of the action. In some embodiments, the reward assigned to each AI agent may be unproportioned. In some embodiments, one goal may be to preform actions that maximize the reward. After convergence, the control system of each AI agent may have an estimate value for pairing with other AI agents nearby such that they may determine the possible AI agents with whom a connection may result in maximum rewards. With value iteration, the control system of each AI agent may eventually know the value of each DTC link and may devise a policy that optimizes its reward collection.

In embodiments, a MDP includes a sequence of observed states s and actions α followed by rewards r, i.e., $s_t, \alpha_t, r_{t+1}, s_{t+1}, \alpha_{t+1}, r_{t+2}, s_{t+2}, \alpha_{t+2}, r_{t+3}, \ldots \alpha_T, r_T, S_T$. The goal of the AI agent is to maximize the net reward $R_T$ to be expected in the future. The net reward $R_T = r_t + \gamma^1 r_{t+2} + \ldots + \gamma^{T-t-1} r_T$ is the sum of the rewards received for the sequence of states and actions experienced beginning from state $s_t$ and ending with terminal state $s_T$, wherein γ is a discount factor applied with value 0≤γ<1. In some embodiments, the control system may solve the MDP by using Q-learning, a method for estimating the expected total net reward in the future of each state-action pair and determining an optimal action-selection policy. In some embodiments, the expected net reward for the execution of a sequence of states and actions may be given by a state-action value function. In some embodiments, one goal is for the control system to find an optimal state-action value function by identifying the sequence of states and actions with highest net reward. Since multiple actions may be taken from each state, over time as the number of states experienced, actions, and transitions increase, a goal of the control system is to also find an optimal policy which includes the action from each state with highest reward value. The value of a state-action pair Q (s, α)=$E[R_T s_t=s, \alpha_t=\alpha]$, also known as the Q-function, may be defined as equivalent to the expected net reward $R_T$ for the sequence of states and actions beginning with state $s_t$ and action $\alpha_t$ and ending with terminal state $s_T$. By finding the sequence of states and actions which maximize the state-action value function Q (s, α), the control system may identify the optimal value function Q*(s, α)=max $E[R_T|s_t=s, \alpha_t=\alpha]$. In some embodiments, the control system may derive the optimal policy for each state π*(s)=argmax Q*(s, α) by identifying the highest valued action that may be taken from each state. To iteratively calculate the state-action value function for a given state s and action α, the control system may apply the Bellman Optimality equation. The optimal value function obeys Bellman Optimality equation Q*(s, α)=E[r+γ max Q*(s', α')]. The equation expresses that the value for a given state s and action α is dependent on the current reward r observed at state s and the maximum discounted γ future reward for the next state s' the AI agent would end up in. The control system may use the equation to iteratively determine the state-action value for a given state s and action α using $Q_{i+1}(s, \alpha)=E[r+\gamma \max Q_i(s', \alpha')]$ as the sequence of states and actions are executed, wherein i is the iteration number beginning at i=0, with $Q_0(s', \alpha')$ being initially guessed. In this particular context, the sequence of states and actions may correspond to the states visited and actions taken (e.g., collaborative actions or individual actions) during a work session or over some time period. Over time, as more states are visited and different actions from each state are evaluated by the control system, the system converges to find the most optimal action to take from each state thereby forming an optimal policy. Further, as different sequences of states and actions are evaluated over time, the system converges to the most optimal sequence of states and actions. In many real-world applications, the complete state of the environment is unknown to the control system of the AI agent. In such cases, an observation may be conditioned on the current state of the AI agent and decisions may be made based on the observations made as the AI agent acts in the environment. In such cases, the control system of an AI agent may implement RL using a Partially observable Markov Decision Process (PoMDP).

In some embodiments, AI agents measure the amount of reward after each cooperative transaction or over a series of cooperative transactions. Each of the control systems of the AI agents may reinforce their connection based on helping each other achieve bigger accumulated reward. In some embodiments, the control system of an AI agent may use Hebbian Learning to measure the strength of the DTC link W using W'(OA, AA)=W+η(R'−R), wherein W is the strength of the link before collaboration, W' is the strength of the link after collaboration, q is the learning rate, R' is the reward received as a result of collaboration and R is an integration of previous rewards or the expected reward had collaboration between AI agents not occurred.

In some embodiments, the control system of an AI agent determines a probability of termination of a DTC link using the Gittins index. In some embodiments, the Gittins index may be a value associated to the state of a stochastic process with a reward function and probability of termination. In some embodiments, the Gittins index may be a measure of the reward that may be achieved by a random process with a termination state and evolving from its present state, with the option of terminating the process at every later stage with the accrual of the probabilistic expected reward from that stage up to the termination state.

In some embodiments, there may be noise in the data of the observer and the action taken by the actuator. In some embodiments, the control system may determine conditional entropy of two events H(AA|OA)=$\Sigma_{ij}$p(OA$_i$, AA$_j$)log p(OA$_i$)/p(OA$_i$, AA$_j$), wherein p(OA$_i$, AA$_j$) is the probability that AA=AA$_j$ and Y=OA$_i$. The entropy may be interpreted as the amount of randomness in the outcome of the action executed by the actuator based on the sensory input provided by the observer. For example, there may be a chance that the observation of the observer is the wrong observation or that the action taken by the actuator is not executed as expected which may result in an expected reward not being given or an unexpected reward being given which may lead to learning noise. Therefore, a probability $$P(AA|OA) = \frac{P(OA|AA)P(AA)}{P(OA)}$$

for the accuracy of observation of the observer agent (OA) and the action of the actuator agent (AA) may be used by the control system of an agent when determining the expected reward, wherein P(OA|AA) is the probability of the OA making an observation given that the AA executes a particular action, P(AA) is the probability of the AA taking a particular action independent of the observation, and P(OA) is the probability of the OA having made an observation.

In some embodiments, the control system of AI agents may randomly prune some connections to avoid suboptimal connections. In some embodiments, the control system may distribute the weight of each pruned connection at the moment of pruning to other random connections that are intact. In some embodiments, the control system balances exploration of new DTC links and exploitation of existing DTC links. For example, actuators may be encouraged to find better sources of information, such as robots with better sensors or ideally positioned sensors, and observers may be encouraged to find actuators that have better use of their information. In some embodiments, the control system uses a regret analysis when determining exploration or exploitation. For example, the control system may determine a regret function $$\rho = T\mu^* - \sum_{t=1}^{T} r_t$$

which is the difference between the reward sum associated with an optimal policy and the sum of the collected rewards, wherein p is the regret after T rounds, $r_t$ is the reward in round t, and p* is the maximum reward mean. In some embodiments, the control system minimizes the regret by defining a cost function, for example $$C(w, b) \equiv \frac{1}{2n}\sum_{x} \|y(x) - a\|^2,$$

and minimizing the cost function using gradient descent. In this way, at each state, the control system chooses a policy that has a state-action value function at least equal to the previous state. In some cases, the control system solves the squared error of the cost function using stochastic gradient descent to minimize the regret. This ensures at each state a policy that has a value function at least equal to the previous state is chosen. In some embodiments, the control system uses a multi-armed bandit model wherein in a finite and countable state space and action space, the strategy is based on starting the sampling process on a uniform basis over a set of available actions and progressively focuses on the best actions according to previously observed rewards. The regret function quantifies the exploration and exploitation dilemma of a multi-armed bandit problem in the search for the most optimal connections. In fact, regret is an integration of all small unearned rewards. Therefore, the data type is the same as the reward which is a multivariate function. In some embodiments, one goal may be to maximize the cumulative reward while equivalently minimizing the regret function.

In some embodiments, the control system of an AI agent may use a Monte Carlo Tree Search (MCTS) in maximizing the reward. MCTS uses a statistics tree comprised of nodes connected by branches wherein nodes are given values and nodes of highest value are of top priority. In some cases, nodes may represent different states. In embodiments, MCTS uses an optimistic search strategy that prioritizes exploring the most promising branches (e.g., determined based on previous rewards). In this model, an action selection distribution may be uniform but not in order. The tree begins at the root node, then connects to child nodes and further onwards leaf nodes. The path from the root to a leaf node may represent, for example, states visited and actions taken to transition between states. There are four main steps in MCTS comprising selection, expansion, play-out and backpropagation. Different paths may be iteratively chosen and associated rewards may be determined by the control system. The result of each path may be back propagated in the tree by the control system to reflect the outcome of the actions taken. In some embodiments, possible actions from a state may be simulated and the action that results in a reward equal to or greater than the previous states may be chosen by the control system. This is the opposite of stochastic gradient descent. In some embodiments, the control system may use Lehmer random number generator $X_{k+1} = g \cdot X_k \mod n$ to randomize actions chosen from an action space, wherein the modulus n is a prime number, g is an element of high multiplicative order modulo n, and the seed $X_0$ is coprime to n.

In some embodiments, collaborative AI agents may have active or passive status, wherein during active status the transmitter of the AI agent may broadcast its presence and capabilities to other AI agents and during passive status the receiver of the AI agent may monitor broadcasts while the transmitter responds to broadcasts from other AI agents. In some embodiments, active and passive statuses are not mutex. For example, AI agents may alternate between active and passive statuses, wherein AI agents may be active or passive at different times or AI agents may become active when DTC links weaken or AI agents may become passive or active depending on the number of DTC links that have been formed. In some embodiments, active and passive mat have different statuses for inbound DTC links and out-bound DTC links. In some embodiments, there may be a maximum number of links set. In some embodiments, there may be a threshold from which point on the AI agent transitions from active to passive.

In some embodiments, information shared between control systems of AI agents may be time stamped and contain a header with an identifier of the AI agent sharing the information. In some instances, wherein the information is passed between control systems of multiple AI agents, the control system of each AI agent sharing the information may add their identifier to the header. This may be used to prevent information looping, wherein the control system of an AI agent may disregard incoming information if the header contains their identifier. In some embodiments, control systems of intermediary AI agents may be bypassed. For example, the control system of an actuator agent connected to a control system of an observer agent directly and also indirectly through a control system of an intermediary observer agent may discard the indirect connection with the intermediary observer agent. As a further example, a control system of an actuator agent connected indirectly to a control system of a first observer agent through the control system of an intermediary second observer agent may initiate a broadcast and request direct connection to the control system of the first observer agent in instances where, for example, the control system of the actuator agent is often receiving useful information from the control system of the first observer agent.

In some embodiments, as multiple AI agents interact with each other, the control system of each agent may establish a different level of trust with each AI agent it may interact with. In some embodiments, the level of trust may increase or decrease with each interaction depending on the outcome of the interaction. In some embodiments, information shared with the control system of an AI agent may be ranked at different levels of priority depending on the source of the information and the level of trust established with the source at the time the information was received. For example, the control system of an AI agent receiving information from control systems of multiple AI agents may rank the priority of information received based on the level of trust established with each AI agent. As a further example, a control system of an agent receiving conflicting information from control systems of two separate AI agents may give higher priority and importance to the information received from the control system of the AI agent with whom a higher level of trust is established.

In an example of collaborating AI agents, an environment of robotic vacuums K and L may be represented by a grid world and described by a m×n matrix G comprising all state spaces available to the robotic vacuums. In a two-dimensional world, each entry of the matrix may represent a cell of the grid world and have a value (x, y). Robotic vacuum K may be considered an observer while robotic vacuum L may be considered an actuator. Robotic vacuums K and L may understand the environment based on environment matrices $G_k$ and $G_L$, respectively. Coverage matrices $C_k$ and $C_L$ may correspond to environment matrices $G_k$ and $G_L$, respectively, and may be used to indicate coverage of the environment. Each entry of a coverage matrix C may correspond to an entry of an environment matrix G such that each time a cell of the environment in matrix G is covered, a corresponding entry in the coverage matrix C is increased by a value of 1, with all entries of the coverage matrix initially having a value of 0. As such, the coverage matrices may allow the control systems of the robotic vacuums to keep track of covered areas of the environment. Initially, each robotic vacuum may begin cleaning the environment individually. At some point, robotic vacuums K and L may meet and establish a DTC link such that the control system of robotic vacuum K, the observer, may share its coverage matrix $C_k$ with the control system of robotic vacuum L, the actuator. The control system of robotic vacuum L may convolve coverage matrices $C_k$ and $C_L$ to combine areas already covered by both robotic vacuums. Since this is an example of cooperative game theory, the control system of robotic vacuum L may devise a policy that distributes coverage of the remaining uncovered cells among the two robotic vacuums considering the maximum reward it may receive itself and the maximum reward it may leave for robotic vacuum K to collect. In some embodiments, wherein the DTC is a two-way link between robots, messages may be exchanged back and forth to ensure the reward function, accounting for the reward received by both robots, is maximized. The uncovered cells of the environment, when divided for coverage by robotic vacuums K and L, may reduce cleaning time of the environment and thereby increase the reward received, assuming the reward is dependent on cleaning time. Further, if total cleaning time of the environment is reduced as a result of collaboration with robotic vacuum K, the control system of robotic vacuum L may reinforce the measure of strength of the DTC link with robotic vacuum K. In some embodiments, wherein non-cooperative game theory is applied and the control systems of robotic vacuums K and L each attempt to maximize their own reward individually at the expense of one another, Nash equilibrium may apply. When each robotic vacuum has chosen a strategy and no robotic vacuums can benefit by changing strategies while all other robotic vacuums keep their strategies unchanged, then the current set of strategies and corresponding payoffs constitute a Nash equilibrium. For example, robotic vacuums K and L are in Nash equilibrium if the control system of robotic vacuum K chooses the best strategy to execute for coverage of the environment, taking into account the policy chosen by the control system of robotic vacuum L and the control system of robotic vacuum L chooses the best policy to execute for coverage of the environment, taking into account the strategy chosen by the control system of robotic vacuum K. In some embodiments, this may be extended to multiple robotic vacuums.

For two or more AI agents, the problem of reinforcement learning (RL) may become more complex. In some embodiments, RL such as Q-learning, may be combined with deep learning (DL). RL may be used to define the objectives while DL may learn the complex representations to achieve such objectives. DL is a general framework for learning the representation of complex models and may be composed of linear transformations, convolution operations, non-linear activation functions, such as ReLU, and loss functions such as, mean square error (MSE) and log likelihood. The combination of RL and DL may be known as Deep Reinforcement Learning (DRL). In instances wherein Q-learning is used, the process may be known as Deep Q-learning (DQL) wherein deep neural networks represent the state-action value function (or Q-function) $Q(s, a; w)$. For example, a Deep Q-Network (DQN) may be a combination of a convolutional neural network (CNN) for learning feature representations with Q-learning algorithm. The DQN may represent the state-action value function $Q(s, a; w)$ wherein w is the network parameters. Given that the optimal value function $Q^*(s, a; w) = E[r+\gamma \max Q^*(s', a'; w')]$ obeys Bellman Optimality equation, a loss function $L(w) = [r+\gamma \max Q^*(s', a'; w') - Q(s, a; w)]^2$ may be defined. In some embodiments, the control system minimizes the MSE of the loss function $L(w)$ by gradient descent in the DQN to find the optimal state-action value function. In some embodiments, the control system uses a separate target network with parameters w', as above, m in estimating the maximum state-action value function. In the loss function, the goal is to minimize the difference between the current estimation of the Q-value (prediction), and an updated estimate (target) that combines the obtained reward and an estimation of the quality of the next state. In some embodiments, the control system balances exploitation of current optimal policy and exploration of potentially better policies by employing a greedy approach that ensures the control system samples a random action some percentage of the time. To avoid suboptimal connections the control system may terminate some connections and for each terminated connection may redistribute its weight to other intact connections. In some embodiments, the control system may use experience replay wherein all experiences (s, a, r, s') may be stored in a replay memory and random mini-batches from the replay memory may be used instead of the most recent transition when training the network. This provides stability as RL may be unstable when a nonlinear function, such as a neural network, is used to approximate the value function.

Figure 2:
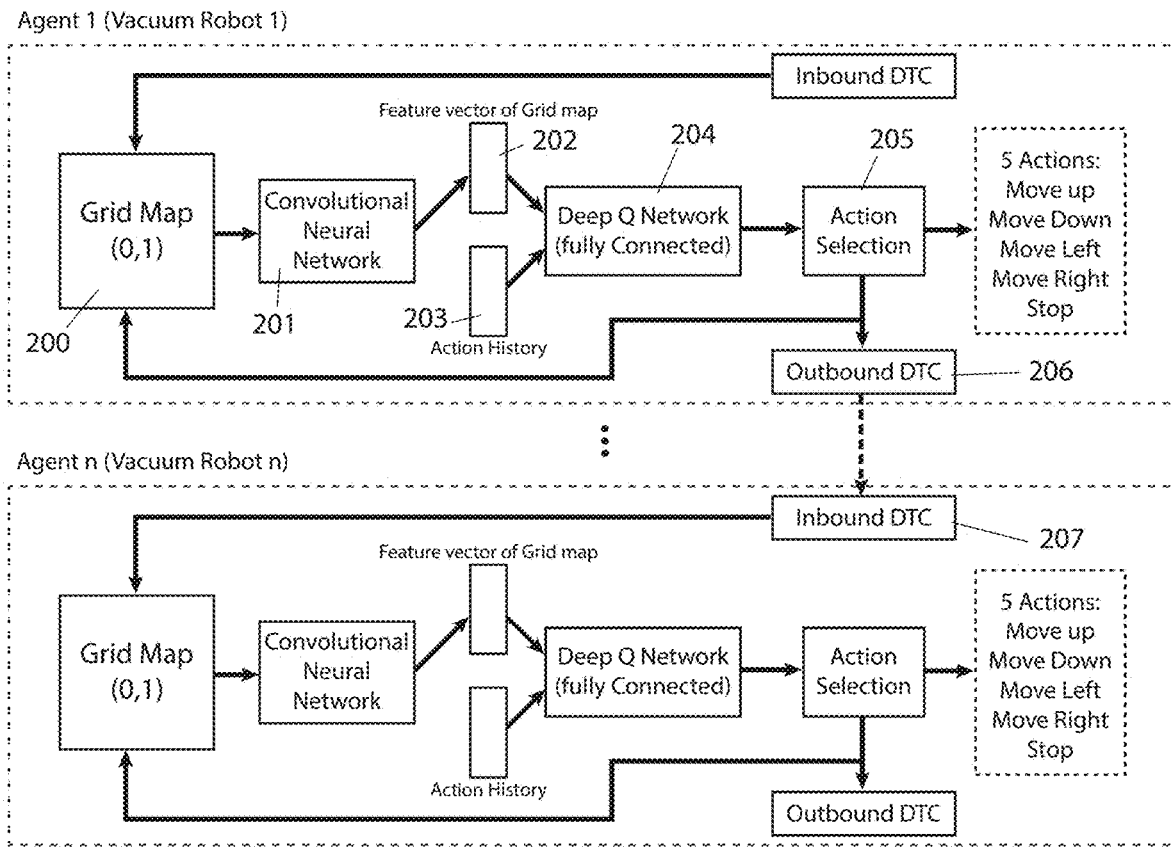
FIG. 2 illustrates an example of a Deep Collaborative Reinforcement Learning framework, according to some embodiments.

In some embodiments, control systems of AI agents use a Deep Collaborative Reinforcement Learning framework for collaborative intelligence, the framework being a combination of a deep convolutional neural network (CNN), a deep Q-network (DQN), and a reward function for action and communication selection. For example, for collaborative robotic vacuums, the input to a CNN by may be a grid map in the form of a two-dimensional array wherein each entry of the array corresponds with a cell of the grid map and an entry having a value of one indicates coverage of the cell while a value of zero indicates no coverage of the cell. The output of the CNN may be merged with a feature of action history and used as input to a DQN. The output of the DQN may be possible actions of the robotic vacuum, such as, move forward, move backward, move right, move left, and stop. Followed by each action, the control system may update the grid map and may share the updated information with control systems of at least some cooperative robots. FIG. 2 illustrates an example of a Deep Collaborative Reinforcement Learning framework used by control systems of robotic vacuums, as in the example described above, wherein grid map 200 is provided as input into CNN 201. Output feature vector of grid map 202 and action history 203 are provided as input into DQN 204 which outputs action 205. Action 205 is passed to outbound DTC 206 which may then be shared with control systems of collaborating robots receiving the information through an inbound DTC, such as inbound DTC 207, to update their grid map accordingly. In some embodiments, the grid map (with values of zero and one for uncovered and covered cells, respectively) provided as input into the CNN is in the form of a 2D input array. In some embodiments, the CNN architecture includes a cascade of convolutions and ReLU functions. For example, the basic architecture used for the CNN may include: a first layer that convolves 32 filters of 8×8 with a stride of 4 and applies a ReLU activation function; a second layer that convolves 64 filters of 4×4 with a stride of 2 and a applies ReLU activation function; and a third layer that convolves 64 filters of 3×3 with a stride of 1 and applies a ReLU activation function. In some embodiments, the DQN architecture includes two fully connected layers which map the input feature map to the output actions, the first layer including a fully-connected layer consisting of 512 rectifier units and the second layer including a fully-connected linear layer with a single output for each valid action (e.g., a total of 5 outputs). In some embodiments, the reward function may be proportional to the whole area that has been covered by the robots. In some instances, a goal of collaboration is to cover an area in the shortest time. For the example of collaborative robotic vacuums described above, the reward function may be based on the total area covered and the total time. To consider both factors in the reward function the control system of a robotic vacuum may assign a reward of one when the robot finishes operation in a cell and negative one when it operates in a cell that has already been cleaned. In some embodiments, the control system incorporates the reward function in a reinforcement learning setting to learn a covering policy, based on the DQN algorithm. In some embodiments, the reward function used by the DQN may be based on various factors depending on the desired goals of the collaborative robots. In some embodiments, different CNN and/or DQN configurations may be used. In some embodiments, modifications in the model may be made to fit temporal difference learning and Q-learning, depending on the real-world applications of the collaborative robots.

In some embodiments, the control system of a robot may train the neural network comprised of a CNN and DQN using Q-learning to learn a policy that maximizes future expected reward as described above. For example, for robotic surface cleaning devices, input into the network may be a feature map in the form of a two-dimensional array and the output Q-values for each possible action. The network may then decide the best action to execute based on the Q-value for each possible action. In some embodiments, the network may be trained millions of times (or another number of times) via Q-learning to maximize the future expected reward. In some embodiments, Q-values may be any real values that the control system may optimize with simple squared error loss $L(w) = [r+\gamma \max_{u'} Q(s', u'; w') - Q(s, u; w)]^2$ using backpropagation. In some embodiments, given a transition (s, u, r, s'), backpropagation includes providing a feed forward pass for the current state s to get predicted Q-value $Q(s, a; w)$ for all actions, providing a feed forward pass for the next state s' to calculate the maximum overall network output $\max Q^*(s', a'; w')$, setting the Q-value target for the corresponding action to $r+\gamma \max Q^*(s', a'; w')$, setting, for all other actions, the Q-value target to the predicted Q-value Q (s, a; w), thereby making the loss zero for those outputs, and updating the weights of the network using back propagation.

Figure 3:
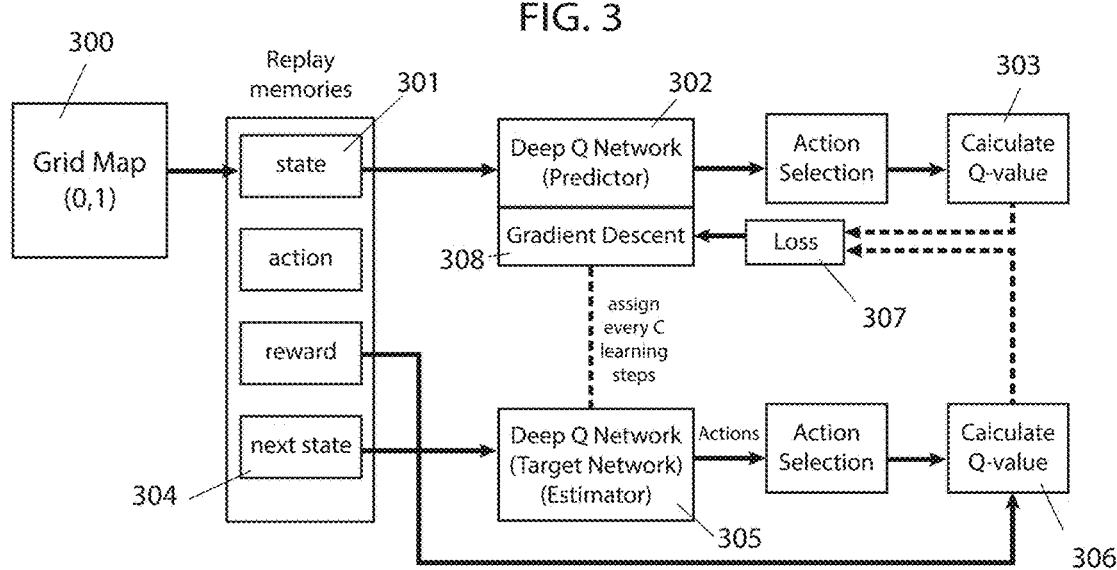
FIG. 3 illustrates an example of a method for training a single DQN of a cleaning robot, according to some embodiments.
Figure 4:
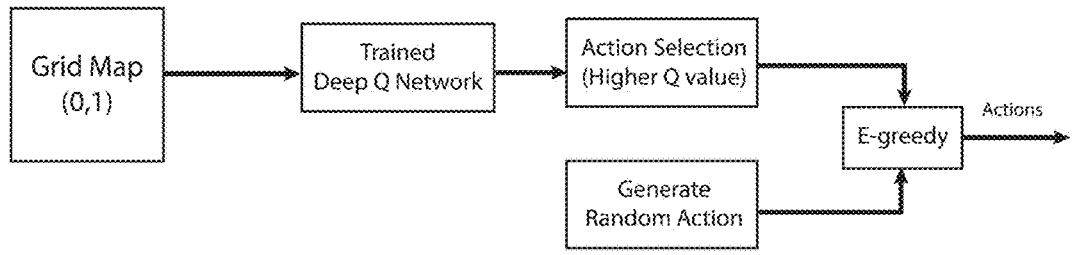
FIG. 4 illustrates a flowchart describing testing of a single cleaning robot, according to some embodiments.

In some embodiments, the control system of a robot employs experience replay wherein all experiences (s, a, r, s') may be stored in a replay memory and random mini-batches from the replay memory may be used by the control system instead of the most recent transition when training the network. This provides stability as RL may be unstable when a nonlinear function, such as a neural network, is used to approximate the value function. FIG. 3 illustrates a schematic of an embodiment of a method used by a control system for training a single surface cleaning robot. Grid map 300 is provided as input to the network. Current state 301 is provided to DQN 302 and predicted Q-value 303 is determined for a selected action. Next state 304 is provided to DQN 305 to determine the maximum overall network output max $Q^*(s', a'; w')$ and set Q-value target 306 for the corresponding action to $r+\gamma$ max $Q^*(s', a'; w')$. Based on loss 307 between target Q-value 306 and predicted Q-value 303, the control system uses gradient descent 308 to minimize the loss and hence optimize the actions of the robot over time. FIG. 4 illustrates a flowchart describing testing of a trained network of a single surface cleaning robot, wherein a grid map is provided as input into a trained DQN and an action selection is provided as output from the DQN. A random action generator simultaneously outputs a random action. Both the action selected by the DQN and the random action from the random action generator are provided as input into a greedy algorithm that chooses either the action output from the DQN or the random action. This allows for a balance between exploration and exploitation.

Figure 5:
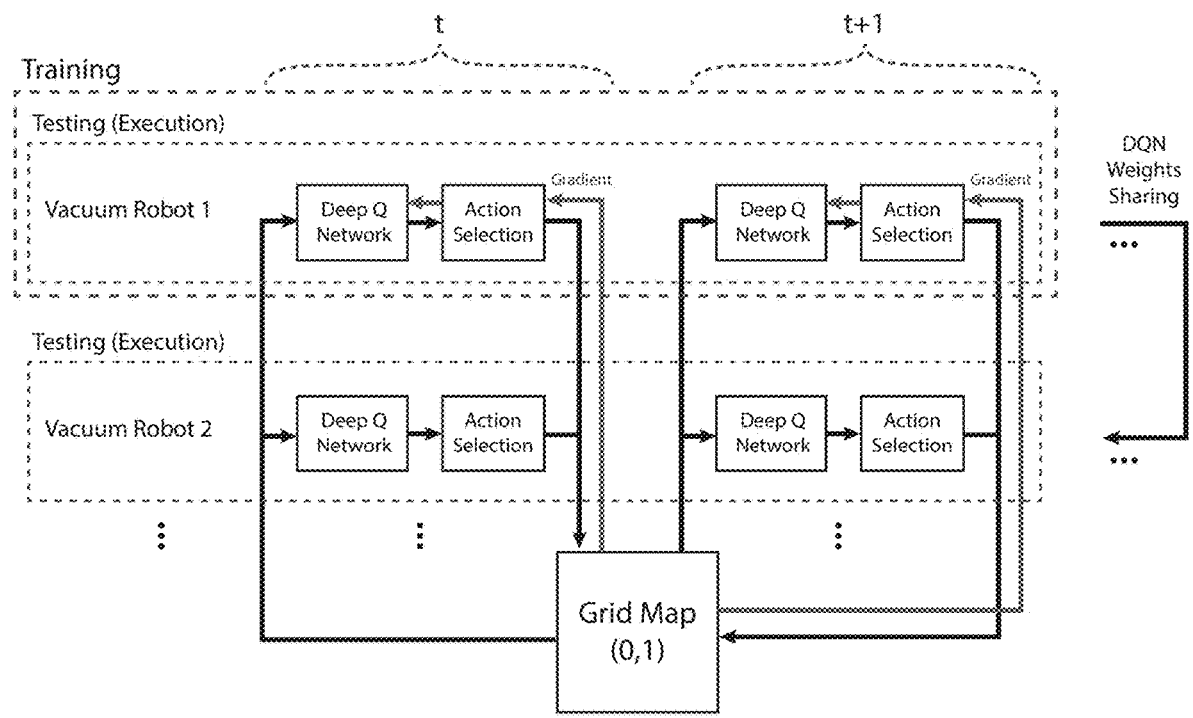
FIG. 5 illustrates an example of decentralized learning for collaborating robots, according to some embodiments.
Figure 6:
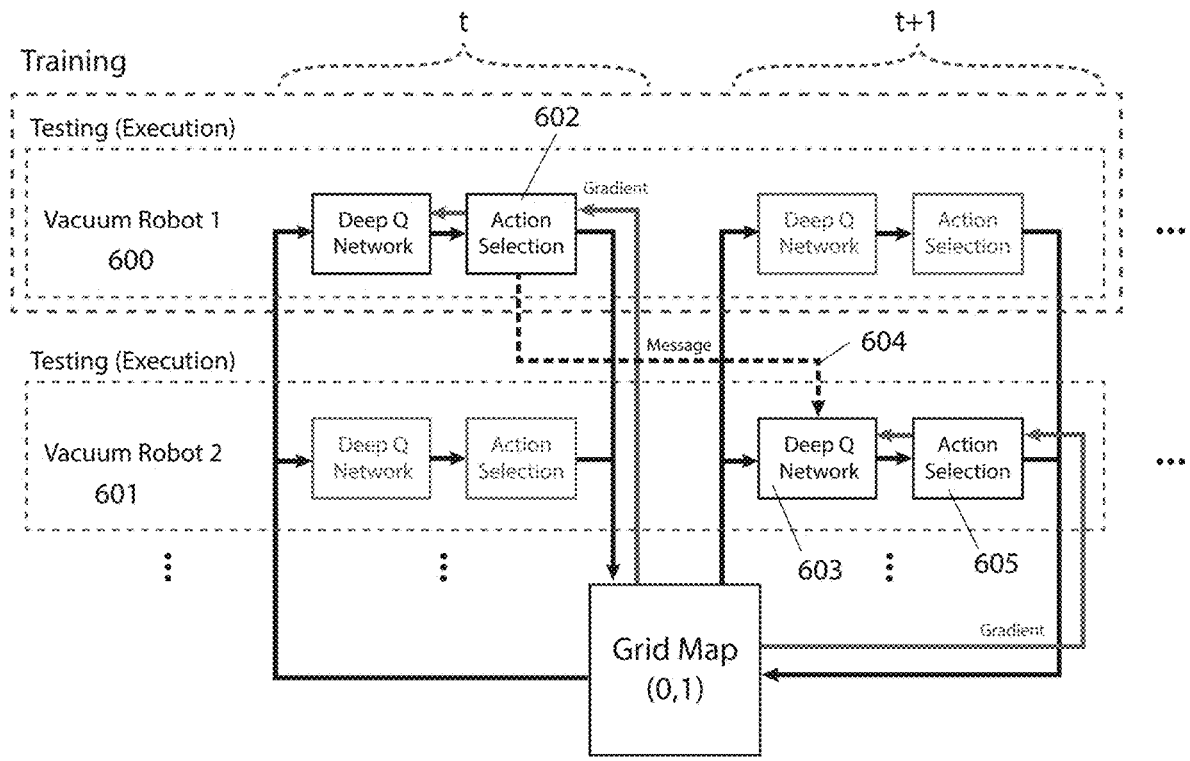
FIG. 6 illustrates an example of decentralized learning for collaborating robots, according to some embodiments.

In some embodiments, decentralized learning may be used wherein the control system of each robot learns its own Q-network parameters, treating the other robots as part of the environment, thereby using the environment as the sole source of interaction between robots. In this case, message passing is accomplished using DTC links to share information. In some embodiments, the control system of a robot trains a single network (e.g., its own network) and shares the parameters with control systems of other robots. However, execution remains decentralized, at which point control systems of robots receive different observations leading to different behavior. For example, control systems of two floor cleaning robots may share grid map information through a DTC link. Followed by each action, the control system of each robot may update their grid map and share their updated grip map with the control system of the collaborating robot. At the same time, only the control system of one robot is training its DQN and sharing the DQN weights with the control system of the other robot while control systems of both robots are testing their own DQN. In some embodiments, decentralized learning for covering areas (e.g., operating in areas) within a map may be beneficial as only one DQN needs to be trained for coverage areas within the map which makes the training faster and less complicated, and the number of collaborative robots is not required wherein at execution time any number of robots may be collaborated for coverage of areas within the map. FIG. 5 illustrates an example of decentralized learning of a single DQN of a robotic vacuum, wherein the network of the first robotic vacuum is being trained and its DQN weights are shared with the control system of a second robotic vacuum. Control systems of the first and second robotic vacuums update their grid map after each action and share their respective grid map information with each other. In such an approach execution is decentralized, control systems of collaborating robots receive different observations leading to different behaviors. FIG. 6 illustrates another example of decentralized learning of a DQN, wherein control systems of two collaborating robotic vacuums, 600 and 601, each learn their own network parameters. The control system of robotic vacuum 600 may share its action selection 602 with the control system, and hence DQN 603, of robotic vacuum 601 as indicated by arrow 604. The control system of robotic vacuum 601 may receive the action of robotic vacuum 600 as input into its DQN 603 and consider it in deciding action 604. In this approach, the control system of each robot learns its own Q-network parameters, treating the other robots as part of the environment. In this case, message passing is accomplished using DTC links to share information. Followed by each action, the control system of each robot updates its respective grid map and shares the information with the control systems of cooperative robots. In this approach, the execution remains decentralized, at which point the control systems of robots receive different observations leading to different behaviors.

Figure 7:
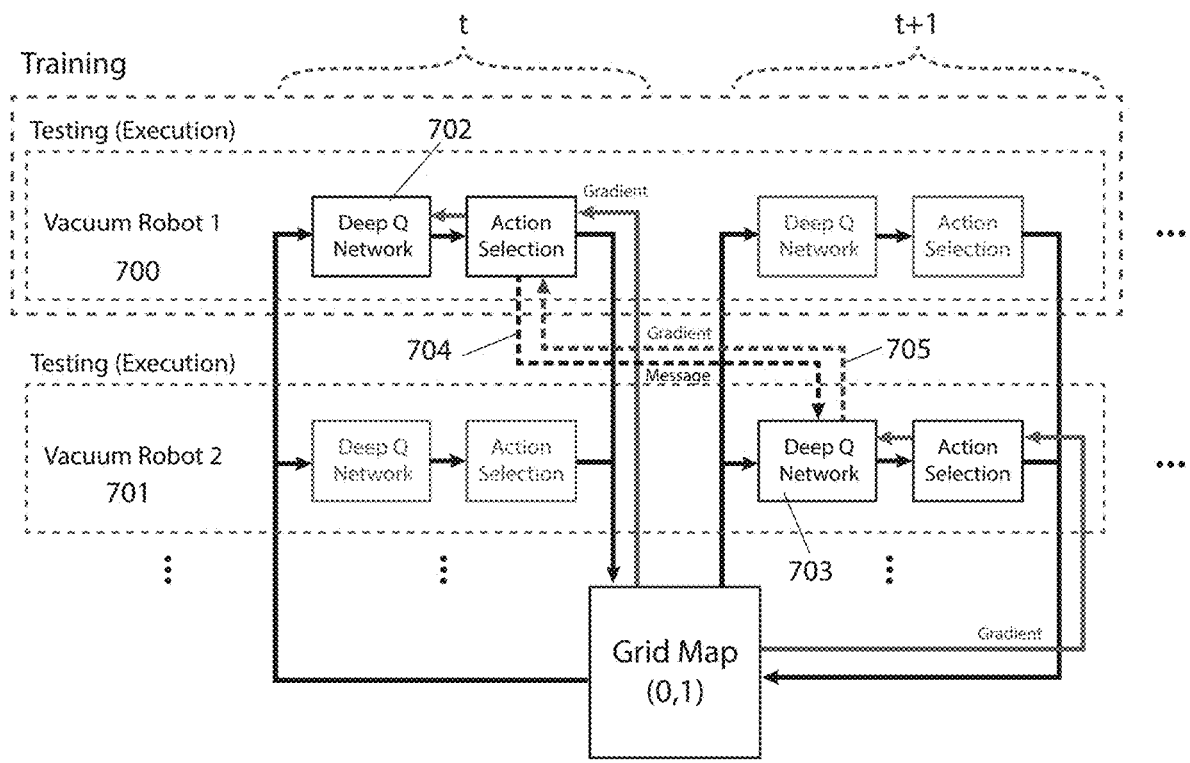
FIG. 7 illustrates an example of centralized learning for collaborating robots, according to some embodiments.

In some embodiments, the control system of a robot may use centralized learning wherein information may be passed between control systems of robots. As a result, gradients may be pushed through DTC links, yielding a system that is end-to-end trainable, even across robots. FIG. 7 illustrates an example of centralized learning for multiple collaborative robots. In this approach, control systems of robots may pass messages between one another during learning. As such, gradients may be pushed through DTC links, yielding a system that is end-to-end trainable across robots. In some embodiments, real-valued messages are discretized by the control systems during execution and mapped to the discrete set of communication actions allowed by the task. FIG. 7 illustrates an example of centralized learning between two collaborating robotic vacuums 700 and 701. DQN 702 of robotic vacuum 700 may pass messages to DQN 703 of robotic vacuum 701 during learning, via their respective control systems, through a DTC link as indicated by arrow 704. The gradient may also be passed from DQN 703 of robotic vacuum 701 to DQN 702 of robotic vacuum 700 as indicated by arrow 705, allowing for a system that is trainable across robots.

In one example, a hierarchical approach employing decentralized training may be used by control systems of surface cleaning robots to collaboratively clean all areas within the map of the environment. In this approach, a model may be trained (e.g., by an external control system or a control system of one or more robots) for cleaning a map with size of 10×10. At execution time, control systems of robots may use the trained model for cleaning a map with size of 100×100. In other embodiments, the model may be used for cleaning a map with any size. In some embodiments, the hierarchical approach employing decentralized training includes: 1) training a DQN on a 10×10 map, which may be efficient in terms of time and complexity, 2) applying the trained DQN to a larger map size such as 100×100, without training for a large map size, and 3) training of the DQN for a single robotic vacuum, while testing of the DQN may be done for multiple collaborative robotic vacuums. In some embodiments, the hierarchical method is composed of two layers. In the first layer, a virtual map (VMap) with size of 10×10 and virtual robotic vacuums are defined. In the second layer, the real large map (LMap) with size of 100×100 and actual robotic vacuums are defined. In some embodiments, the actual robots move in the LMap based on 1) the movement of the robots of the first layer and 2) their own DQN network. In some embodiments, the LMap may be considered as 100 small maps (SMap) with size of 10×10.

In some embodiments, each SMap in the LMap may be equivalent to one cell in the VMap of the first layer. In some embodiments, the VMap (with size 10×10) may be considered as a low-resolution version of the LMap (with size 100×100) and each cell in the VMap may be equivalent to a 10×10 block in the LMap. In some embodiments, the DQN for cleaning of the VMap is initially executed for virtual robotic vacuums. In some embodiments, the trained DQN of a single robot on a 10×10 map is used. In some embodiments, the output of the executed DQN for cleaning of the VMap in the first layer are the cleaning paths (and hence cells covered) of all virtual robotic vacuums. In some embodiments, these cleaning paths indicate how the actual robotic vacuums should move in the LMap of the second layer and which SMap should be cleaned by each robot. For example, if a virtual robot 1 cleans locations (2,3), (3,3), (3,4), etc. in the VMap, the actual robot 1 should clean SMaps at locations (2,3), (3,3), (3,4), etc. in the LMap, respectively. In some embodiments, in the second layer, for each SMap, the DQN for each actual robotic vacuum is executed to clean the Lmap. In some embodiments, at the second layer, each SMap is cleaned by only one of the actual robots, while the whole LMap is cleaned by all the actual robots. Therefore, in some embodiments, the first layer indicates which blocks of the second layer should be cleaned by each robot.

In some embodiments, decentralized learning with a single DQN may be used in the training and testing (execution) phases, as described above. In some embodiments, the single DQN may be trained (e.g., by the control system of a robot or an external control system) using a map with size of 10×10, and then in the testing phase, the trained network may be used by control systems of collaborative robotic vacuums for cleaning a map with size of 100×100. In other embodiments, other sizes of maps may be used. In the training phase, the control system of a single robotic vacuum may use a single DQN for cleaning of a map with size of 10×10. In some embodiments, 'VacuumRobot' and 'Environment' classes may be used to define a robotic vacuum and a map with size of 10×10, respectively. Followed by the training, the training weights that may be used by control systems of robotic vacuums for cleaning of a new map are obtained. In the testing phase, the trained DQN may be used by control systems of multiple robotic vacuums for cleaning of a new map. In this approach, the single trained DQN may be used and its parameters shared among control systems of all robotic vacuums. In some embodiments, a list of objects may be defined from the 'VacuumRobot' class to represent the collaborative robotic vacuums and the 'Environment' class may be used to define a map with size of 100×100.

Figure 8:
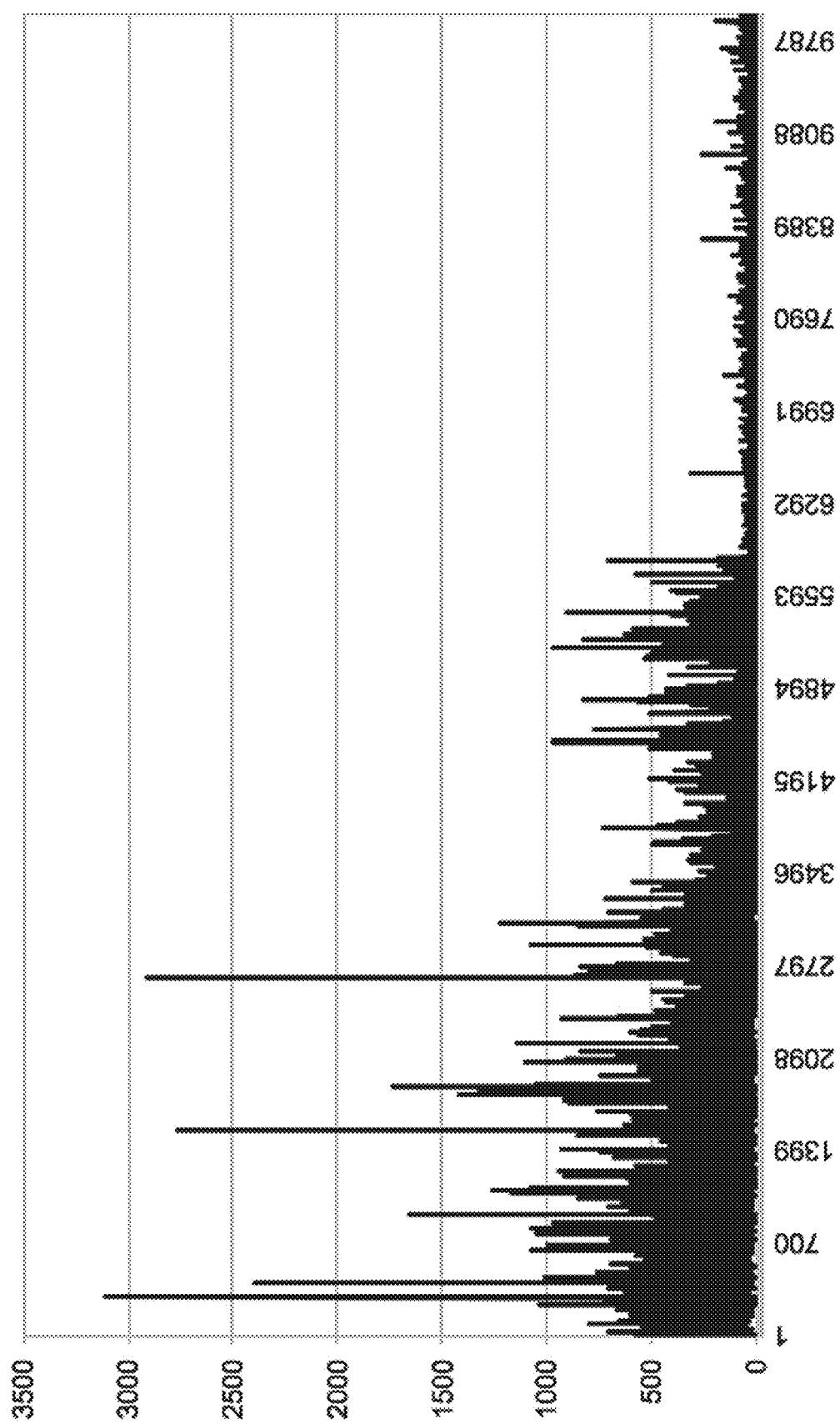
FIG. 8 illustrates the total movements of a robot during cleaning for consecutive episodes while training a DQN.

In one example, a single robotic vacuum and one-dimensional environment are initially defined. In this case, there are two types of movement for the robot: left or right. A class for the robot and a class for the environment are defined. The environment is defined as a one-dimensional vector with three possible values, including 0 (uncleaned cell), 1 (cleaned cell) and 2 (robot location). The DQN is defined with a two layer fully connected network (512 rectifier units and 2 nodes). A target network (i.e., estimator) and predictor network are implemented in the DQN and memory function to remember the previous states, actions, and replay. The environment is expanded from one dimension to two dimensions by extending the DQN from two movements to four movements (left, right, up, down) by adding CNN layers to the DQN. The convolutional layers include convolutional filters and activation functions. The convolutional filters extract features from the input map while the activation functions perform nonlinear mapping. The configuration of the deep network (CNN and DQN) is extended by changing the number of filters and layers. A network with five layers (three convolutional layers and two fully connected layers) is used. The first, second, and third convolutional layers include 32 (size of 8×8), 64 (size of 4×4) and 128 (size of 3×3) filters, respectively. The two fully connected layers include 512 rectifier units and 4 nodes. Modules for saving and loading of the model of the DQN are implemented. A module for graphical visualization of robotic vacuums in the environment is used. FIG. 8 illustrates the results of training the DQN described in this example for a 3×3 map and a single robotic vacuum. However, the DQN uses three layers instead of five and the input filter size is reduced from 8×8 to 3×3. FIG. 8 illustrates the total movements of the robot for cleaning the map (vertical axis) versus episode number (horizontal axis). At the beginning of the training, a large number of movements were needed (on average 300 movements) while after around 6000 episodes of training, on average, 15 movements were needed for cleaning of the map with size 3×3. Therefore, using 6000 episodes, the DQN may be trained.

Figure 9:
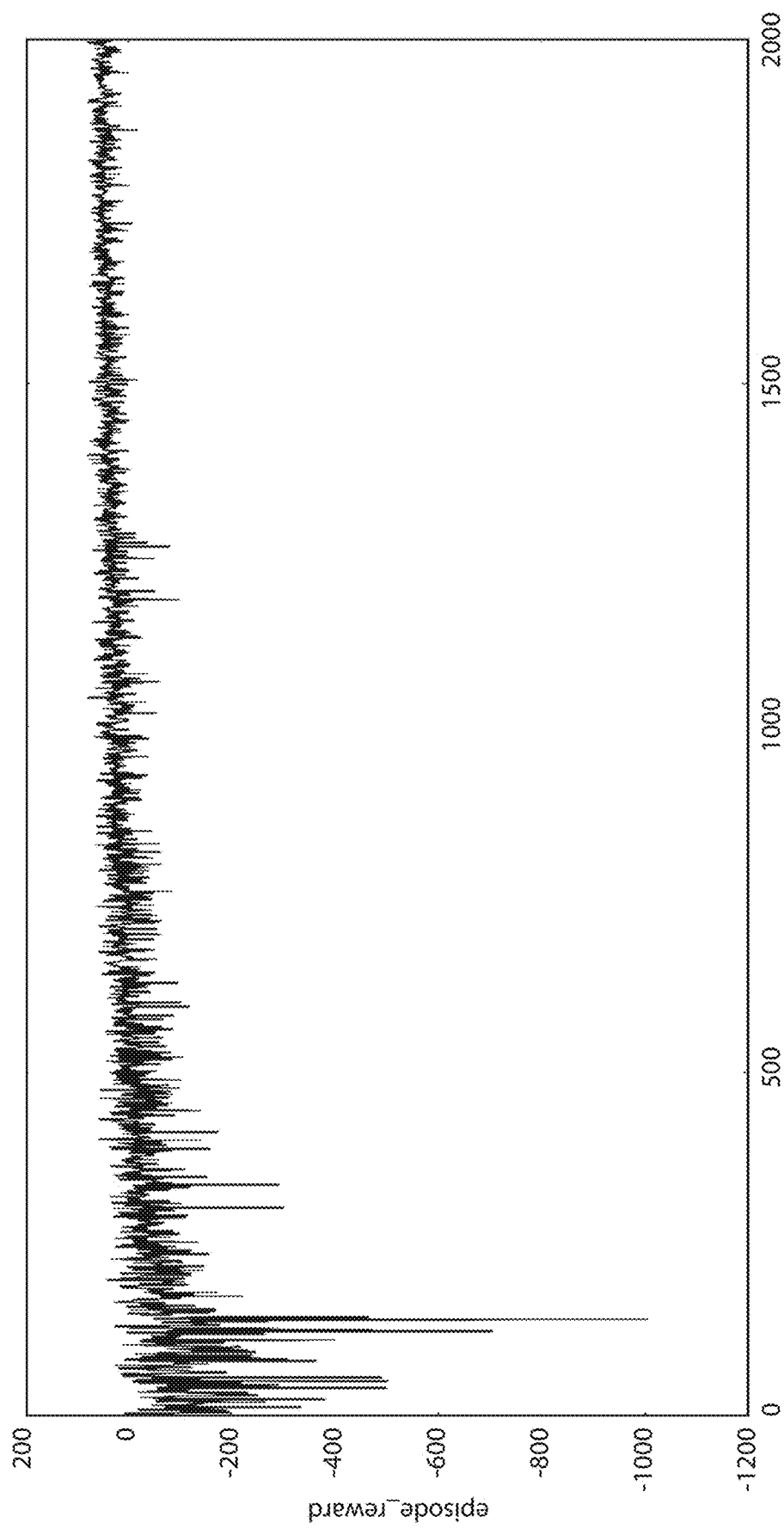
FIG. 9 illustrates a graph of episode reward for consecutive episodes resulting from training of a Kers-rl based DQN.

In another example, a modified Keras-rl library is integrated into the DQN. In the 'Environment' class a map size of 84×84 is used. A reward function assigning a reward of one when the robot cleans an uncleaned cell and negative one when the robot cleans a cleaned cell is implemented. In the Keras-rl library, a main module which has a fit function for training and also network model definition is used and the input channel of the DQN is changed from 3 channels to 1 channel to be the same as the map. The fit function is used for training of the network. Since the map is large, training may be slow, therefore in this example training is treated as complete when 100 cells are cleaned. This means the robot only cleans a part of the whole map (100 cells instead of the 7056 cells) at each episode. The DQN includes 5 layers (three convolutional layers and two fully connected layers). The size of the three convolutional filters are 8×8, 4×4 and 3×3 with 32, 64, and 64 filters, respectively. The fully connected layers include 512 rectifier units and 4 nodes, for four movements. The size of the input to the network is 84×84 (the map size). The Keras-rl based network is trained for one robot to clean a part of a map (100 cells of a 84×84 size map). The DQN was trained for 2000 episodes. FIG. 9 illustrates the graph of episode reward (vertical axis) versus episode number (horizontal axis) while training the Kers-rl based DQN described in this example. In this example, for an episode, the maximum reward that a robot could achieve was 100 since there are 100 cells to clean, while the minimum reward could be any value less than 100. FIG. 9 shows that the DQN network of the robotic vacuum learned to clean the map efficiently. At the beginning of the training, the episode reward was negative (on average −100), meaning that an average of 300 movements were needed to clean 100 cells in one episode. By increasing the training steps, the reward became positive, and at the end of training the episode reward was 50 on average, meaning that 150 movements were needed to clean 100 cells in one episode. At the beginning of the training, the robot cleaned previously cleaned cells multiple times resulting in a reward of negative one each time a cleaned cell was cleaned and a total negative reward for an episode. However, after several training episodes, the robot learned to only clean uncleaned cells.

Figure 10:
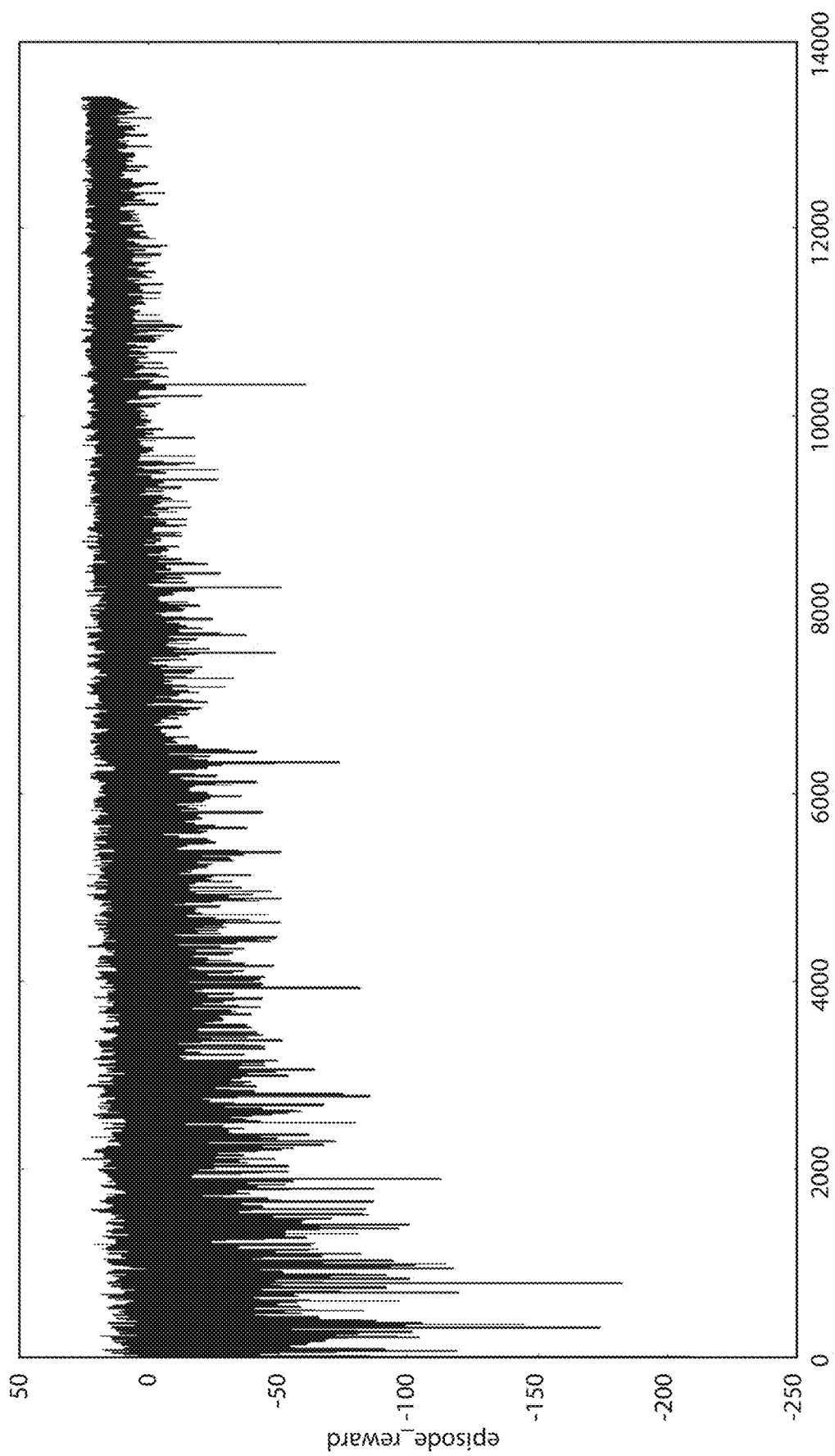
FIG. 10 illustrates a graph of episode reward for consecutive episodes when training a DQN for 1,000,000 steps.

In another example, the DQN is trained for a map with size of 10×10. In this example, the same DQN as described in the example above is used except the size of convolutional filters are reduced to 4×4, 3×3, and 3×3 with 32, 64, and 64 filters, respectively. Also, instead of 4,2,1 pooling used in the above example, 1,1,1 pooling is used and the size of the input to the network is 10×10 (the map size). Instead of cleaning all of the cells of the 10×10 map, the length of an episode is reduced to cleaning 25% of the 10×10 map (25 cells out of 100 cells). FIG. 10 illustrates a graph of episode reward (vertical axis) versus episode number (horizontal axis) while training the DQN for 1,000,000 steps. The results show that the episode reward improved and the DQN converges. At the beginning of the training, the episode reward was approximately −30 while by increasing the number of steps, the episode reward became approximately 10.

Figure 11:
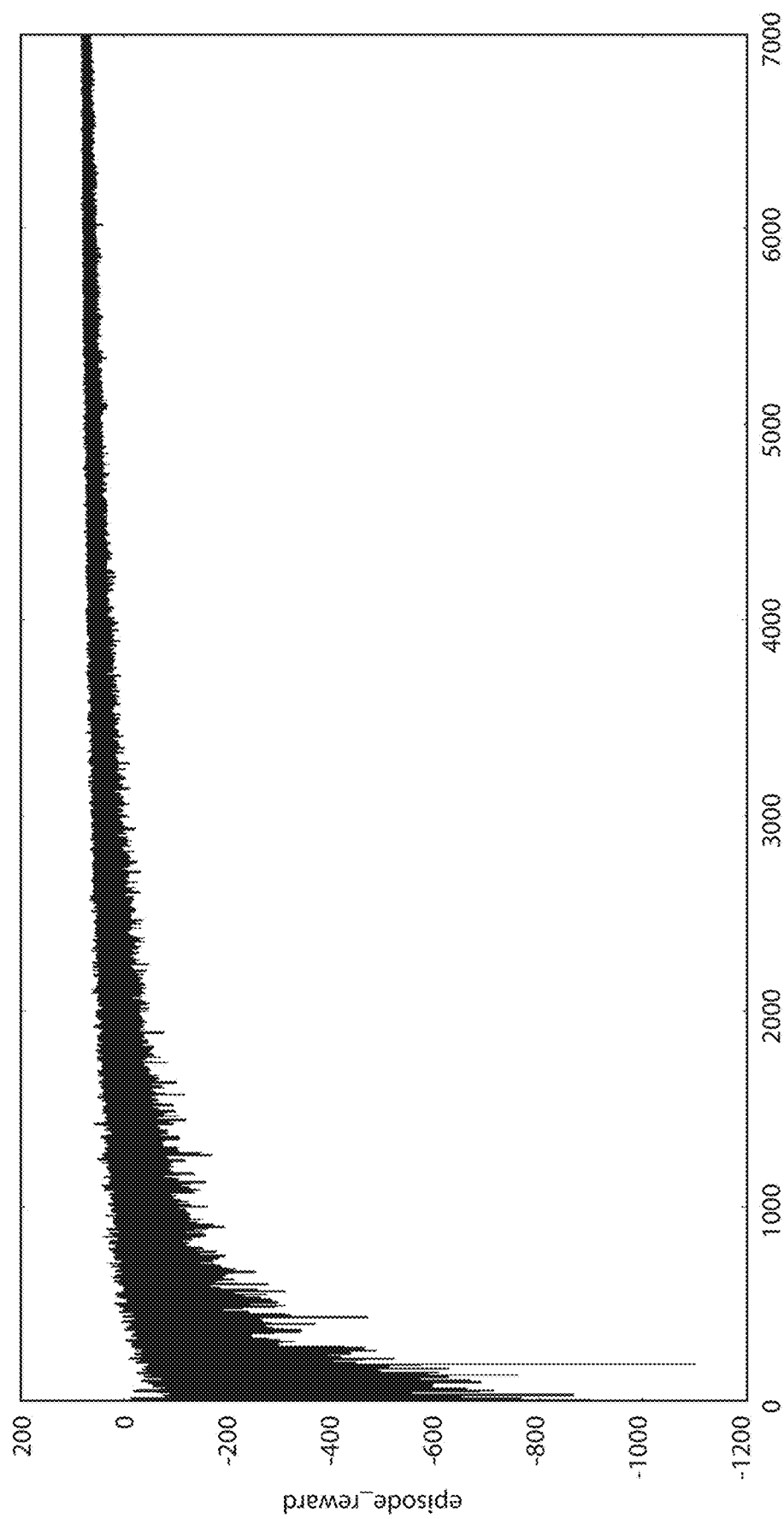
FIG. 11 illustrates a graph of episode reward for consecutive episodes when training a DQN for 10,000,000 steps.

In another example, two scenarios for cleaning of a map with size of 10×10 are considered. In the first scenario, instead of cleaning all cells of the map with size of 10×10, the length of an episode is reduced to cleaning 80% of the map (80 cells out of 100 cells). The reduction is implemented as training the robotic vacuum to clean the whole map may be time consuming. The DQN of a single robot was trained with 10,000,000 steps, including 70500 episodes. FIG. 11 illustrates a graph of episode reward (vertical axis) versus episode number (horizontal axis) when training the DQN for 10,000,000 steps. At the beginning of training, episodes include more steps compared to the end of training. The results show that the robot learned to clean the map. For instance, at episode 7 (at the beginning of training) the robot moved 455 times to clean 80 cells and got a reward of −294. In the middle of training the total movements of the robot required to clean the 80 cells decreased and the reward increased. In the last episode, the robot learned to clean the map efficiently and used 82 movements to clean 80 cells and received a reward of 79, with the maximum possible reward being 80. In the second scenario, a fixed number of steps is set for each episode, 100 steps in this example for cleaning 100 cells of the map. The DQN was trained for a single robot with 10,000,000 steps including 10,000 episodes (each episode including 100 steps). The results show that the robot learned to efficiently clean the map. For instance, at episode 10 (at the beginning of training) the robot cleaned 27 cells with 100 movements and obtained a reward of −46. In the middle of training, the total number of cleaned cells and the reward increased. In the last episode, the robot cleaned 91 cells with 100 movements and obtained a reward of 82.

In the previous example, a DQN of a single robotic vacuum was trained for cleaning of a map with size of 10×10 based on two scenarios: 1) the robotic vacuum cleaning 80% of the map and 2) the robotic vacuum having a fixed number of 100 steps in each episode. Based on these scenarios, there were two trained DQN models. In another example, the Keras-rl library is extended to use these two DQN models for multiple robotic vacuums. In this architecture, multiple robots simultaneously clean cells of the map. Therefore, at each step, the state is affected by multiple DQNs and multiple cells are cleaned. Each robot chooses their next action based on the cells cleaned by all the robots at the previous step. For this example, the two models are tested for cleaning 90% of a 10×10 map by multiple robotic vacuums (1, 2, 3, and 4 robotic vacuums). To calculate the reward, the reward is divided by the time of cleaning. For example, for 2, 3 and 4 robots, the reward is divided by 1/2, 1/3 and 1/4, respectively. The results show that by increasing the number of robotic vacuums, the total number of movements are increased because there is an overlap in the cleaning of the cells by different robots. However, by increasing the number of robots, cleaning time of the map is decreased. For example, by using two robots, cleaning time decreased to half. The results showed that by increasing the number of robots the total reward was increased and the robots collaborated effectively to clean the map.

In some embodiments, objects are added to the map by defining a new variable obstacle in the 'Environment' class. The obstacle variable may be defined as a matrix of the same size as the map, each matrix entry corresponding with a cell (i.e., location) in the map. The values of each entry in matrix may be zero to indicate no object or one to indicate the presence of an object. In some embodiments, the robots clean the cells of the map based on the values of the entries in the matrix defining the obstacle variable. If a cell is occupied by an object, the robot may not move into that location. In some embodiments, the DQN makes decision about the next movement of the robot based on the current state of the robot. In some embodiments, a post-processing check is implemented to make sure the next location of a robot is not occupied by an object. If the next location is occupied by an object, the robot does not move to that location.

In some embodiments, to collaboratively clean a 100×100 map, each robotic vacuum cleans a SMap with size of 10×10 and then moves to the next SMap. In some embodiments, there is a jump from the ending point in the current SMap to the starting point of the next SMap because in each SMap the initial and final locations of the robot are random. In some embodiments, the initial location is selected by a random function and the final location is indicated based on the decision of DQN. Therefore, in some embodiments, movement of the robot between the SMaps may not be continuous. In some embodiments, when a robot finishes cleaning of the current SMap, the initial location of the next SMap is randomly indicated. In some embodiments, the control system of a robot implements a path finder method to find the shortest path from the last location in the current SMap to the initial location in the next SMap and avoid jumps. In some embodiments, the robot moves along the path to the next SMap and starts cleaning of the next SMap. In some embodiments, the path finder method may be based on Dijkstra method to find the shortest path by considering the objects (or otherwise obstacles).

In some embodiments, AI agents may be distributed over a network, such as a network in the cloud, such that they may be present at various locations. In such cases of remote collaborative intelligence, parameters such as latency may be considered. For example, latency may be considered when an autonomous car is using satellite images to chase a moving car. A challenge that may arise for an actuator agent is choosing whether to use its own less accurate local observations or more accurate remote observations from an observer agent. Convergence may be reached with trials. In some embodiments, there may be a threshold latency time after which the information may be rendered useless by the control system of an AI agent. In some embodiments, information is time stamped and validity of information decays as time passes. In some embodiments, a half-life for information may be set.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

The invention claimed is:

1. A system of at least two robots, comprising:
   a first robot, comprising:
      a first plurality of sensors;

a control system of the first robot; and
a first tangible, non-transitory, machine-readable medium storing instructions that when executed by the control system of the first robot effectuates operations of the first robot comprising:
generating or updating, with the control system of the first robot, a first grid map of an environment;
tracking, with the control system of the first robot, first grid cells of the first grid map within which work has been performed in and second grid cells of the first grid map within which work is yet to be performed in by the first robot while the first robot continues to perform coverage of the environment;
generating, by the control system of the first robot, a suggested operational schedule of the first robot based on previous times the first robot was operated, wherein a user is presented the suggested operational schedule;
actuating the first robot to operate according to the suggested operational schedule; and
transmitting a message to a control system of a second robot; and
the second robot, comprising:
a second plurality of sensors;
the control system of the second robot; and
a second tangible, non-transitory, machine-readable medium storing instructions that when executed by the control system of the second robot effectuates operations of the second robot comprising:
generating or updating, with the control system of the second robot, a second grid map of the environment independent from the first gird map;
actuating, with the control system of the second robot, the second robot to begin performing coverage of the environment upon receiving the message from the control system of the first robot; and
tracking, with the control system of the second robot, third grid cells of the second grid map within which work has been performed in and work is yet to be performed in by the second robot while the second robot continues to perform coverage of the environment;
wherein the control system of the first robot and the control system of the second robot are configured to establish a connection and communicate with an artificial intelligence home assistant device.

2. The system of claim 1, wherein:
the operations of the first robot further comprise:
actuating, with the control system of the first robot, the first robot to execute at least one action;
transmitting, with the control system of the first robot, information to the control system of the second robot; and
the operations of the second robot further comprise:
receiving, with the control system of the second robot, the information from the control system of the first robot; and
actuating, with the control system of the second robot, the second robot to execute at least one action based on the information received from the control system of the first robot.

3. The system of claim 2, wherein the information comprises at least one of a delegation of the task, a distribution of a task, situational awareness of the control system of the first robot, a cleaning schedule, a cleaning location, a cleaning time, an allocated task, areas covered by the first robot, and the first grid map.

4. The system of claim 1, wherein the first robot and the second robot are surface cleaning robots with different surface cleaning functions.

5. The system of claim 1, wherein the control system of the first robot transmits the message after completing the coverage of the environment by the first robot.

6. The system of claim 1, wherein the coverage performed by the first robot and the coverage performed by the second robot are executed at the same time or at different times.

7. The system of claim 1, wherein:
the operations of the first robot further comprise:
monitoring, with a receiver of the first robot, broadcasts from other robots;
detecting, with the receiver of the first robot, a broadcast announcing a presence of the second robot from a transmitter of the second robot; and
establishing, with the control system of the first robot, a wireless connection with the second robot; and
the operations of the second robot further comprise:
broadcasting, with the transmitter of the second robot, the presence of the second robot.

8. The system of claim 1, wherein the operations of the first robot or the operations of the second robot further comprise:
storing and processing, with the control system of the first robot or the control system of the second robot, at least some information on at least one of a cloud and an external device.

9. The system of claim 1, wherein the operations of the first robot or the operations of the second robot further comprise:
monitoring, with the control system of the first robot or the control system of the second robot, at least one of a proximity, a functionality, a capability, and a role of at least one other robot.

10. The system of claim 1, wherein:
the operations of the second robot further comprise:
transmitting, with the control system of the second robot, information to the control system of the first robot; and
the operations of the first robot further comprise:
receiving, with the control system of the first robot, the information from the control system of the second robot;
wherein the information comprises at least one of a delegation of a task, a distribution of the task, situational awareness of the control system of the second robot, a cleaning schedule, a cleaning location, a cleaning time, an allocated task, areas covered by the second robot, and the second grid map.

11. The system of claim 1, wherein the at least two robots of the system are distributed over a network.

12. The system of claim 1, wherein the first robot begins performing coverage upon receiving second message from the artificial intelligence home assistant device.

13. The system of claim 1, wherein:
the operations of the first robot further comprise:
transmitting, with the control system of the first robot, the first grid map to the control system of the second robot; and
the operations of the second robot further comprise:
receiving, with the control system of the second robot, the first grid map for use in navigating the environment.

14. The system of claim 1, wherein the operations of the first robot further comprise:
  inferring, with the control system of the first robot, presence or absence of the user within the environment based on sensor data, wherein the environment comprises a home of the user; and
  actuating, with the control system of the first robot, the first robot to perform an action based on the presence or the absence of the user within the environment.

15. The system of claim 1, wherein:
  the operations of the first robot further comprise:
    marking, with the control system of the first robot, first obstacles observed in the environment at corresponding first locations within the first grid map; and
  the operations of the second robot further comprise:
    marking, with the control system of the second robot, second obstacles observed in the environment at corresponding second locations within the second grid map.

16. A method for collaboration between at least two robots, comprising:
  generating or updating, with a control system of a first robot, a first grid map of an environment;
  tracking, with the control system of the first robot, first grid cells of the first grid map within which work has been performed in and second grid cells of the first grid map within which work is yet to be performed in by the first robot while the first robot continues to perform coverage of the environment;
  generating, by the control system of the first robot, a suggested operational schedule of the first robot based on previous times the first robot was operated, wherein a user is presented the suggested operational schedule;
  actuating, with the control system of the first robot, the first robot to operate according to the suggested operational schedule;
  transmitting, with the control system of the first robot, a message to a control system of a second robot;
  generating or updating, with the control system of the second robot, a second grid map of the environment independent from the first gird map;
  actuating, with the control system of the second robot, the second robot to begin performing coverage of the environment upon receiving the message from the control system of the first robot; and
  tracking, with the control system of the second robot, third grid cells of the second grid map within which work has been performed in and work is yet to be performed in by the second robot while the second robot continues to perform coverage of the environment;
  wherein:
    the control system of the first robot and the control system of the second robot are configured to establish a connection and communicate with an artificial intelligence home assistant device;
    the first robot and the second robot are surface cleaning robots with different surface cleaning functions; and
    at least some processing is executed on a cloud or an external device.

17. The method of claim 16, wherein the control system of the first robot transmits the message after completing the coverage of the environment by the first robot.

18. The method of claim 16, wherein the first robot begins performing coverage upon receiving second message from the artificial intelligence home assistant device.

19. The method of claim 16, further comprising:
  transmitting, with the control system of the first robot, the first grid map to the control system of the second robot; and
  receiving, with the control system of the second robot, the first grid map for use in navigating the environment.

20. The method of claim 16, further comprising:
  inferring, with the control system of the first robot, presence or absence of the user within the environment based on sensor data, wherein the environment comprises a home of the user; and
  actuating, with the control system of the first robot, the first robot to perform an action based on the presence or the absence of the user within the environment.

* * * * *